United States Patent [19]

Arora et al.

[11] Patent Number: 5,035,908
[45] Date of Patent: Jul. 30, 1991

[54] EVAPORATIVE PROCESS FOR PRODUCING COFFEE GLASS

[75] Inventors: Vijay K. Arora, Montvale, N.J.; Gary V. Jones, Bremen, Fed. Rep. of Germany; John M. Kovtun, Rahway; Ronald G. Gabbard, Iselin, both of N.J.

[73] Assignee: Kraft General Foods, Inc., Glenview, Ill.

[21] Appl. No.: 518,268

[22] Filed: May 7, 1990

Related U.S. Application Data

[63] Continuation of Ser. No. 231,810, Aug. 12, 1988, abandoned.

[51] Int. Cl.$^5$ ................................................ A23F 5/26
[52] U.S. Cl. .................................... 426/388; 426/448; 426/594; 426/650
[58] Field of Search ............... 426/594, 650, 388, 651, 426/448

[56] References Cited

U.S. PATENT DOCUMENTS

| | | |
|---|---|---|
| 1,240,020 | 9/1917 | Boberg et al. . |
| 2,457,036 | 12/1948 | Epstein . |
| 2,816,840 | 12/1957 | Turkot et al. . |
| 2,826,504 | 3/1958 | Chase et al. . |
| 2,856,291 | 10/1958 | Schultz . |
| 2,906,630 | 9/1959 | Turkot et al. . |
| 2,919,989 | 1/1960 | Schultz . |
| 2,929,717 | 3/1960 | Eskew . |
| 3,041,180 | 6/1962 | Swisher . |
| 3,419,399 | 12/1968 | Earle et al. . |
| 3,625,704 | 12/1971 | Andre et al. . |
| 3,652,293 | 3/1972 | Lombana et al. . |
| 3,657,010 | 4/1972 | Mitchell et al. ................. 127/70 |
| 3,704,137 | 11/1972 | Beck . |
| 4,004,039 | 1/1977 | Shoaf et al. ..................... 426/548 |
| 4,154,864 | 5/1979 | Risler et al. ..................... 426/594 |
| 4,499,112 | 2/1985 | Miller et al. ..................... 426/276 |
| 4,520,033 | 5/1985 | Tuot .................................. 426/96 |

FOREIGN PATENT DOCUMENTS 1278216 6/1972 Canada .
0158460 1/1988 European Pat. Off. .

*Primary Examiner*—Joseph Golian
*Attorney, Agent, or Firm*—Thomas A. Marcoux; Thomas R. Savoie; Linn I. Grim

[57] ABSTRACT

A coffee glass is disclosed which is prepared by evaporating coffee extract to at least 45% solids and then further evaporating that extract to form as viscoelastic fluid containing above 3% to 12% water and about 88% to 97% total coffee derived solids, aromatizing and/or gasifying the fluid in a confined headspace shaping the fluid, and cooling the fluid to entrap and protect coffee aromas providing less than 20% loss of volatiles.

3 Claims, No Drawings

EVAPORATIVE PROCESS FOR PRODUCING COFFEE GLASS

This application is a continuation of application Ser. No. 231,810, filed Aug. 12, 1988 and now abandoned.

BACKGROUND OF THE INVENTION

1. Technical Field

This invention relates to vegetable extracts, more specifically extracts of coffee and processes for producing aromatic coffee viscoelastic fluids in a confined headspace, without the need of a drying or dehydration step. On cooling of the fluid there is formed hard coffee glasses which trap aromas. The coffee fluid may also be aromatized or gasified prior to cooling. This invention provides an improved, economical process for aromatizing and preparing shelf-stable coffee products which have not suffered from prolonged heat damage occasioned by freeze-drying, spray-drying or other conventional means of dehydration and yet may be quickly reconstituted in hot water to yield coffee of excellent flavor and aroma. The process is particularly suitable for producing aromatized stable coffee glass.

2. Prior Art

The present invention is concerned with the manufacture of vegetable extracts and, particularly, instant coffee. The manufacture of instant coffee involves extracting roasted and ground coffee beans with water under conditions of high temperature and pressure to form extracts which are dried with or without aromas added by known means, such as spray-drying, freeze-drying or the like.

In an early effort to avoid drying of such coffee extracts by Eskew, U.S. Pat. No. 2,929,717, issued Mar. 22, 1960, a fifty-fifty mixture of concentrated coffee extract and an invert sugar solution were concentrated in a thin film evaporator to form a product having four percent or less water which was pumped out of the evaporator and formed on chilling rolls into small flakes which were easily broken into a coarse product before packaging. In this process, the product temperatures exiting the evaporator ranged from 220° F. to 290° F. and the products produced had moisture contents of about 1 to 4% and were hygroscopic by reason of the addition of large amounts of the invert sugars. This type of processing was also applied by Turkot et al., U.S. Pat. No. 2,906,630, issued Sept. 29, 1959. While the process of Eskew and Turkot et al. produced coffee products without the need to spray-dry, a filler was employed which is not suitable in today's market. Furthermore, special packaging would be required to reduce the chance of moisture contamination which would be disastrous because of the hygroscopisity of the coffee product produced.

In another attempt, Earle Jr., et. al., U.S. Pat. No. 3,419,399 patented Dec. 31, 1968, prepared soluble coffee doughs having a moisture content of 9.5 to 12.5% at a temperature below 140° F. and then dryed the dough to 1-4%. This material was very sticky and difficult to process.

Another attempt to produce dehydrated vegetable extracts is disclosed by Risler, et. al., U.S. Pat. No. 4,154,864, issued May 15, 1979. Risler, et. al. formed a paste or powder which is extruded into a subatmospheric pressure chamber to puff the coffee product. For example, freeze-dried instant coffee powder, having a moisture content of 2.5%, is extruded into a chamber at 80 mb and cut to form grains about the size of a pea which dissolve in cold water. When compared to these grains extruded into atmospheric pressure in Example 5 of that patent, the products with cellular internal structure are far more soluble.

In Andre, et al. U.S. Pat. No. 3,625,704 issued Dec. 7, 1971, dense flakes of instant coffee are prepared and aromatized from roll-milled instant coffee.

In the field of flavor fixation, particularly of essential oils, a number of patents have issued teaching a carbohydrate glass to protect the flavor. For example, Swisher U.S. Pat. No. 3,041,180 discloses a method for fixing flavorants in an extruded carbohydrate substrate. The product of the Swisher invention is obtained by emulsifying an essentially water-insoluble essential oil with a molten mixture of glycerol and corn syrup solids as the continuous phase, extruding the emulsified mass in the form of filaments into a cold fluid, preferably an organic solvent for the essential oil which is a nonsolvent for the corn syrup solids, followed by impact breaking of the solidified filaments into small particles of usable form and then holding the particles in the solvent, preferably for an extended period, to remove essential oil from the surfaces of the particles together with a substantial portion of the residual moisture contained on and in the particles. This methodology is conducted in excess of 130° C.

Beck U.S. Pat. No. 3,704,137 method for preparing an essential oil composition. His method involves the cooking of an aqueous solution of sucrose and hydrolyzed cereal solids until it is at a boiling point of about 122° C., and the water level reaches a desired minimum. At this point, the heating is stopped, the mixture is agitated, and an emulsifier is added. The emulsifier is necessary in order for a homogeneous solution to form. While the solution is cooling, the essential oil and an antioxidant are added, and are intimately mixed. The final mix is forced through an extruder under air pressure. At this point, about 0.5% by weight of the final composition of an anticaking agent is added to prevent the particles from sticking.

Shoaf et al U.S. Pat. No. 4,004,039 discloses a process for the encapsulation of "Aspartame" in any number of matrix forming materials. The product is formed by creating a hot melt which, upon cooling, is capable of forming a relatively amorphous matrix within which the sweetener is discretely dispersed.

EPO published patent application 0158460 to Pickup et al., teaches a method for fixing volatile flavorants in a food-approved substrate, and more particularly to a low-temperature methodology for fixing volatile flavorants in an extruded "carbohydrate-glass" substrate. Volatiles or essential oils are dry blended with 10-30% low molecular weight carbohydrate, food acid or the like and at least 70% of a high molecular weight polymeric carbohydrate which contains at least 95% material above 1,000 molecular weight. The dry mixture is extruded to form on cooling a hard glass like substance.

Evaporators of the type used to concentrate the coffee in this invention are known as Filmtruders and are described in a publication describing "Luwa Polymer Machine", which are used to remove volatile components from polymers.

While these methods have enabled workers in the art to produce useful products, they have not provided a means for producing aromatized coffee glass which is prepared from 100% coffee derived material.

SUMMARY OF THE INVENTION

It has been discovered that a stable instant coffee product can be prepared from a process which involves obtaining a mixture containing about 3% to 12%, preferably above 4% to 9% water, and about 88% to 97%, preferably about 91% to about 96% total coffee derived solids, by concentrating coffee extract using an evaporator that operates under high torque and distributes a thin layer of about ⅛ of an inch of a concentrated coffee extract from 47-55% solids or more in a spiral pattern downward on a heated wall. Rotors coming within ⅛ of an inch to the heated wall maintain the extract layer and propel the extract downward in a spiraling pattern. A vacuum is maintained on the evaporator to maintain a molten product exiting the evaporative section at 60° C., more preferably 80° C. or more. The extract with a final concentration of from 88% to 97% solids preferably from 91% to about 96% solids, passes from the evaporative section to a holding tank. The extract is then aromatized and gasified if desired and well mixed. The extract is next shaped and rapidly cooled to affect a phase transition from liquid coffee fluid to a coffee solid or glass with a retention of at least 50%, preferably 70% and, most preferably, 80% or more of volatiles and, finally, the cooled product can be ground or otherwise processed into useful coffee products. We have found volatile retention by this invention to be better than freeze-drying or spray-drying coffee, particularly aromatized coffee.

In a preferred embodiment, the process for preparing an improved soluble coffee product would comprise: (a) evaporating a preconcentrated 100% coffee extract having a solids content of 45% or greater to a solid content of 88% to 97% or preferably 91% to about 96% by weight solids while subjecting the concentrated solids to sufficient heat and shear to give a molten liquid coffee at 60° C. to 130° C., preferably 70°-110° C., most preferably 80° C. to 100° C. under a confined headspace; (b) aromatizing and/or gasifying the viscoelastic fluid under confined headspace and blending to form a homogeneous mixture; (c) shaping and rapid cooling of the homogeneous mixture to affect a phase transition from viscoelastic fluid to coffee glass with at least 50% retention of volatiles preferably 75%, most preferably 80% retention of volatiles; and (d) grinding and sizing the solidified mixture.

The advantages of total evaporative preparation of coffee glass is an opportunity for (1) good volatile retention by avoiding prolonged dehydration steps, (2) prevention of coagulation and other physical changes which occur during conventional drying of coffee extracts, (3) formation of small chips of concentrated flavor which can be incorporated in coffee products, (4) formation of new shapes for soluble coffee, (5) providing increased coffee processing capacity by using concentration and extruding equipment, rather than spray or freeze-drying to give final coffee products, (6) incorporation of coffee mannan and coffee cellulosic hydrolysates in the coffee glass without producing hygroscopic products. It is important in seeking these advantages to reduce the potential for thermal degradation by limiting temperature and residence time.

DESCRIPTION OF THE INVENTION

In accordance with the present invention, a coffee glass product is prepared by evaporating coffee from a dilute extract to a highly viscous, dense viscoelastic fluid of 88% to 97% coffee solids and 3% to 12% water at a temperature of from 60° C. to 130° C. The mixture is then optionally aromatized using a concentrated coffee aroma, synthetic aroma or mixtures thereof. Preferably, pure coffee aroma derived from the extract is employed. The mixture is gasified if lighter density is desired. The mixture is then thoroughly mixed in a restricted or confined area under pressure and rapidly cooled to affect a phase transition and form a coffee glass.

The coffee mixture can be prepared from coffee extract obtained by normal percolation after stripping aroma from the extract to recover aroma, the extract is subjected to falling film evaporators or other suitable concentration devices to obtain a solids content of at least 45%. The concentrated coffee is next subjected to the Filmtruder Polymer machine where the solids content of the extract is raised to 88% to 96% solids. Aroma is then added back to the extract which is then formed into useful products.

In accordance with the present invention, coffee extract is concentrated to 45% solids or greater using conventional coffee evaporating and stripping techniques. For example, coffee extract may be concentrated in a vacuum triple effect evaporator to above 45% solids. A portion of the evaporate may be retained for aroma recovery. Alternatively the coffee extract is stripped in a column to remove volatile components prior to evaporation. The concentrated extract is next passed through a Filmtruder Polymer machine wherein a rapidly turning rotor lays a thin film of extract on the evaporator wall tangentially to the wall and affect a downward spiral flow by having paddles directing the extract in a downward pattern while others spread the extract tangentially and perpendicular to the axis of the rotor. Films of ⅛ inch extract ±1/64 inch work very well.

While the rotors of such machines may turn from 50 to 700 rpm, we prefer to employ 350 to 550 rpm for coffee extract. Steam of 35-45 psig is applied to the jacket of the evaporator while a vacuum of from 7 to 14 inches of mercury is usually applied on the extract side of the evaporator. Pressure above atmospheric may be applied to maintain a extract temperature from 60° C.-130° C. The extract is pushed down the evaporator barrel by the wiping effect of the rotor blades and exits the evaporative section at a concentration of 88% to 97% solids, preferably 91% to about 96% solids. A high pressure gear pump is used to remove the extract, which can have a viscosity of up to about 1,000,000 centipoise from the evaporator.

If desired, a holding tank or area is added to collect the concentrated extract adjacent to the evaporative section and prior to the pump. This area allows the use of the gear pump to deliver a variable flow of highly concentrated fluid to mixers for the subsequent aromatizing and/or gasifying and forming parts of the process. Alternatively, a gear pump can be used to force the concentrated extract to the feed tank and another gear pump used to feed later stages of the process. Preferably, the holding tank is equipped with means for mixing and maintaining temperature.

From the holding tank the concentrated viscoelastic fluid may be forced under pressure through a series of static mixers where coffee aroma and/or inert gas is introduced into the fluid.

After introducing aroma and/or gas the fluid is thoroughly mixed and passed to a shaping device where films, ropes or other shapes are formed. The fluid at 60°–130° C., preferably 70°–110° C., most preferably 80°–100° C., is formed and rapidly cooled to a brittle glass. Cooling is accomplished by immersing or spraying with cold gas or in a cold tunnel or for film by stretching the film exiting a sheeting die.

The rapid cooling sets the outer layer of the formed fluid and prevents any appreciable loss of coffee aroma.

Once brittle the glass is reduced in size by grinding or other means and sized by screening to the desired finished product. When the product is above 6% water content a drying step is used to reduce the moisture to 2.5%–5% $H_2O$. This stabilizes the coffee preventing clumping and stabilizes the product against aromatized flavor loss.

This invention, in addition to working well with conventionally extracted roasted and ground coffee extracts, can also be applied to those extracts which are obtained from coffee by heat, acid, enzymatic or base hydrolysis. For example, a portion of the coffee solids, may be derived from hydrolyzed mannan which forms oligomers having a DP anywhere from 1 to 8. These materials are generally obtained by high pressure, short time, high temperature treatment of residual coffee grounds which cause the mannan to be hydrolyzed to lower molecular weight oligomers, having DP's up to 8. The coffee can also contain cellulosic sugars derived from the cellulosic components of coffee which are produced by the enzymatic, acid or base hydrolysis of such coffee solids.

The concentrated extract used in this invention has a dry basis composition as follows:

|  | % | Preferred % |
|---|---|---|
| Total Carbohydrates | 15–50 | 30–40 |
| Reducing Sugars included in total carbohydrates | 5–20 | 5–15 |
| Protein | 5–15 | 6–10 |
| Alkaloids | 0–6 | 2–6 |
| Chlorogenic Acid | 2–35 | 5–15 |
| Other Acids | 2–12 | 4–8 |
| Ash | 2–16 | 5–9 |

We have found that while the composition of roasted coffee can have a considerable amount of caramelized sugar the resulting glass is not hygroscopic because of the moisture limitation used in preparing the glass melt.

Once the coffee mixture is prepared, it may be gasified by injecting into the mixture and uniformly blending various gases, such as nitrogen, carbon dioxide, air or others, which will cause a reduction in the density of the coffee mixture and allow flexibility and control of the final coffee product density. Such gasification also helps in producing improved solubility and has an effect on lightening the color of the product, both useful when designing new forms of coffee products using the glass as a component.

In addition, aromas are added, either with the gasification step, or separately, such as by injecting the aromas into the mixture and then homogeneously blending the mixture. Thermal degradation and loss of the aroma is prevented by cooling the melt immediately after it is forced through an orifice or series of orifices when shaping. On exiting the orifices, the coffee fluid quickly solidifies and cools to a hard glass. We preferred to cool the aromatized coffee within 180 seconds, preferably within 120 seconds and, most preferably, within one minute by using a liquid nitrogen bath, cooling chamber or other rapid cooling techniques.

The coffee glass is particularly valuable for protecting and stabilizing natural and synthetic flavors and aromas which may be added to the coffee. Apparently, the high solids content of the molten liquid phase under pressure allows rapid formation of a homogeneous aromatized mixture which can be immediately cooled to affect a phase transition from viscoelastic fluid to coffee glass with less than 50% loss, preferably less than 30%, most preferably less than 20% loss of volatile aromas. Optionally, inert gas may be incorporated in the aromatized melt to protect the aromas against oxidation, to adjust density, and improve solubility of the final cooled melt or coffee glass. Once cool, the coffee glass can then be broken into the desired size.

Suitable flavors and aromas include aromas collected from roasted and ground coffee called grinder gas, aroma from coffee extract sometimes called vent gas and aromas from coffee oil, steam aromas, vacuum aromas, aroma stripped from the extract prior to its concentration or part of the evaporate recovered from concentration and any other known forms of coffee aroma and flavor. In addition, colloidal coffee may be added.

The following examples are intended to illustrate the present invention without limiting it.

EXAMPLE I

Crystal Formation

Brown coffee extract at about 55% solids concentration is fed to the preheater at a rate of about 160 lb/hr by the Waukesha, size 15, feed pump. On the discharge side of the pump, the extract passes through a Tate Andale model ID strainer to remove any sediment before entering the preheater. In the hot water jacketed preheater, Luwa model #TV0030, the extract temperature is raised from ambient to 77° C. The preheater rotor is run at 160 RPM. The heated extract exits the top of the preheater and flows to the evaporator inlet.

The heated extract enters the top of the evaporator, Luwa model #HS0050. The evaporator's rotor speed is maintained at about 380 rpm and is driven hydraulically by a Falk fluid power drive, model #30VCVf-AA-2123-70. A Nash pump, size AT-64, is used to create the 7 inch Hg vacuum in the evaporator. Saturated steam of about 34 psig is passed through the evaporator jacket to heat the extract inside to about 93° C. The thickening of the extract causes a rotor torque of about 1,100 inch-lbs. The vaporized water is drawn out the top of the evaporator and into the top of the condenser. The fixed shell and tube condenser has a surface area of 67 $ft^2$ and is supplied with plant chilled water. A Gould pump, model #3196, draws the condensed evaporator drawoff from the condenser to a collection vessel or to drain.

Beneath the evaporator the concentrated extract, about 91% solids, enters a custom-made 3-gallon spool piece. A level of about 1½ gallons is maintained. The spool piece level is detected via a K-Ray level sensor model #7062B. The concentrated extract is removed from the spool piece by a MAAG Vacorax gear pump, model #70/70, run at a speed of 30 rpm. A Nametra direct readout viscometer, model #667-9-87, located below the discharge of the Vacorax pump, senses the visocity of the coffee fluid which runs between $5 \times 10^4$ to $1 \times 10^6$ cp. Full-port type C-1 ball valves from Mogas are used to divert the fluid to the static mixers and formation die. The pressure at the Vacorax pump discharge and the formation die inlet are sensed via Gentran model GF-72/6-XXX-5M, -365 pressure tranducers and Gentran model GF-434 digital indicators.

The viscoelastic coffee fluid is pumped through three sections of static mixers each containing fourteen Sultzer SMX type mixing elements. Coffee aromas are injected into the coffee fluid through custom-made Sultzer injection nozzles. An Eldex metering pump, model #AA-100S, is used to feed the aromas at rates and conditions that vary with the coffee blends used. As the viscoelastic fluid and aromas pass through the static mixers they form a homogeneous product which is then extruded through an HPM series 2500 sheet die. The 12-inch wide die is gapped to a 0.005 inch opening. electric heaters provided by HPM are used to maintain the die temperature of 200° F.

The coffee sheet extruded through the die is stretched by a belt conveyor with a stainless steel mesh belt at a rate of between 50-150 ft/min. The conveyor length is about 18 ft. The coffee sheet, having cooled on the belt is then fed to an Urschel grinder, model N. A Sweco vibrating screener, model #LS 18S333, is used to screen the ground coffee flakes to the specified size of −12/+30 U.S. mesh. The screened flakes are then dried in a Jeffrey TMV 2 ft × 15 ft long vibrating, fluid-bed dryer to achieve the desired 4.5-4.75% moisture.

EXAMPLE II

Roast-and-Ground Form Formation

Brown coffee extract of about 55% solids concentration is preheated and concentrated as in Example 1. The resulting viscoelastic coffee fluid at about 92% concentration is pumped through the static mixers via the Vacorax gear pump as in Example 1. To achieve the desired roast-and-ground appearance, liquid carbon dioxide is injected directly from a GP-45 carbon dioxide portable tank at 300 psig at a mass flow rate of about 0.1 lb carbon dioxide per pound of coffee solids. The carbon dioxide flow rate is controlled by regulating the back pressure at the injection nozzle.

After mixing, the viscoelastic coffee fluid is extruded through an electrically heated HPM series 100 strand die consisting of between 1 to 8, ⅛ inch diameter holes angled downward at 45°. The resulting strands of coffee, now slightly expanded and speckled in appearance due to the flashing carbon dioxide, are conveyed from the die along an 18 ft long stainless steel mesh belt conveyor and rapidly cooled. The strands from the belt conveyor are then ground, screened, and dried as in Example 1 with the product size being −8/+24 U.S. mesh.

Other novel soluble coffee forms such as freeze-dried and roasted whole bean look-alike are possible by injecting gas or supercritical fluid at various flow rates with a Bran and Luebbe 55 mm plunger piston pump, model #A7365.

Other typical examples are summarized in the following table:

TABLE I

Pilot Plant Run Summary

| Run # | Feed to Evaporator | | | Evaporator | | Product | Temp. at evaporator discharge (°C.) |
|---|---|---|---|---|---|---|---|
| | Rate (lb/hr) | Conc'n % | Temp. (°C.) | Vacuum (inch Hg) | Rotor RPM (% Max.) | Conc'n % | |
| A | 160 | 59 | 82° | 8 | 380 | 92.5 | 93° |
| B | 180 | 50 | 78° | 8 | 240 | 90.5 | 93° |
| C | 100 | 48.5 | 62° | 8 | 350 | | 93° |
| D | 135 | 57.2 | 77° | 8 | 230 | 91.9 | 91° |

Comments:
A. Liquid carbon dioxide was injected into the static mixer to control product density or color. Product was collected as ropes then granulated and sized and after dried. Density: 0.342 g/cc Color: 20° L. Size: −8, +20 US mesh
B. Product stretched to form a thin film. Thin, shiny cyrstals were dried to stable mositures. Density: .599 g/cc Color: 18° L. Size: −8, +20 US mesh
C. Product shaped as ropes then granulated and sized. No drying required. Density: 0.462 g/cc Color: 18°L Size: −8, +US mesh
D. Product stretched to form thin film. Thin, shiny crystals were dried to stable moistures. Density: 0.462 g/cc Color: 18° L. Size: −8, +US mesh

What is claimed is:

1. A process for preparing an improved soluble coffee product comprising:
   (a) evaporating a totally coffee extract to at least 45% totally coffee-derived solids;
   (b) recovering an aroma from the totally coffee extract either prior to and/or during said evaporation;
   (c) further evaporating said totally coffee extract of at least 45% totally coffee-derived solids to a viscoelastic fluid of 91 to about 96% totally coffee-derived solids by forming a thin film of concentrated extract on a heated evaporator wall and propelling the extract down the wall in a thin film by use of rotating blades having a wall clearance of about ⅛ inch while maintaining the fluid at 80° to 100° C.;
   (d) collecting said fluid and pumping said fluid through a confined pressurized headspace mixing zone where coffee aroma is added and thoroughly mixed into the fluid;
   (e) rapidly cooling the mixture to trap the coffee aroma within a brittle coffee glass, the solids content of which is 100% coffee-derived with a retention of said coffee aroma of at least 80% or more of volatiles; and
   (f) grinding and sizing the mixture and drying if necessary to a stable moisture content of less than 6% water.

2. The process of claim 1 which further includes injecting a gas into the viscoelastic fluid coffee.

3. The process of claim 1 further comprising grinding the coffee glass and blending said ground coffee glass with dry coffee solids having a moisture of less than 4.5% by weight in a weight ratio effective to prepare a coffee product having an average moisture of no more than 5% by weight.

* * * * *